United States Patent [19]

Presti

[11] Patent Number: 4,664,353
[45] Date of Patent: May 12, 1987

[54] TUBE ASSEMBLY FOR USE IN TIRE RETREADING

[75] Inventor: Frederick J. Presti, Warrington, Pa.

[73] Assignee: Custom Rubber Products, Inc., Warrington, Pa.

[21] Appl. No.: 766,148

[22] Filed: Aug. 16, 1985

Related U.S. Application Data

[63] Continuation-in-part of Ser. No. 621,864, Jun. 18, 1984, abandoned.

[51] Int. Cl.⁴ .................. B28B 7/32; B29C 33/76; B29D 30/56
[52] U.S. Cl. .................... 249/65; 138/98; 156/96; 156/120; 156/121; 156/129; 156/130; 156/130.5; 156/909; 264/36; 264/315; 264/326; 425/23; 425/27; 425/45; 425/53
[58] Field of Search ............ 152/512, 511, 195, 510; 156/120, 121, 118, 96, 128.6–130, 130.5, 503, 514, 909; 425/23, 45, 27, 49, 51–53; 264/36, 326, 315; 138/98; 428/36; 249/65

[56] References Cited

U.S. PATENT DOCUMENTS

| | | | |
|---|---|---|---|
| 1,498,864 | 6/1924 | Cady | 156/120 |
| 1,521,879 | 1/1925 | Glickert | 152/512 |
| 2,582,715 | 1/1952 | Murray | 425/53 |
| 2,607,392 | 8/1952 | Snyder | 152/512 X |
| 3,932,088 | 1/1976 | Harada et al. | 425/52 X |
| 4,309,234 | 1/1982 | Witherspoon | 206/398 X |
| 4,587,302 | 5/1986 | Berta | 152/510 X |

Primary Examiner—Donald Czaja
Assistant Examiner—Thomas Bokan
Attorney, Agent, or Firm—Howson and Howson

[57] ABSTRACT

A tube assembly for use in a process of vulcanizing a pre-cured tread onto a tire casing is disclosed. The tube assembly includes an elastomeric tubular wall having an inner periphery with a protective non-woven fabric layer covering a major portion thereof. The fabric layer includes a plurality of polyester cords extending in parallel relation in a single ply elastomeric matrix. Longitudinal edges of the fabric are covered by thin strips of elastomer bonded to the fabric layer and the tube wall. Superimposed fabric reinforcing swatches are bonded to the fabric layer around the valve stem. The tube assembly is resistant to being damaged prematurely by the rim which supports the tire casing in the tread vulcanization process.

6 Claims, 3 Drawing Figures

TUBE ASSEMBLY FOR USE IN TIRE RETREADING

CROSS-REFERENCE TO RELATED APPLICATION

This application is a continuation-in-part of copending application Ser. No. 621,864, filed on June 18, 1984, now abandoned.

FIELD OF THE INVENTION

The present invention relates to tire retreading, and more particularly, the present invention relates to a tube assembly for use in supporting the tire casing during the course of vulcanizing a pre-cured tread thereon.

BACKGROUND OF THE INVENTION

There are essentially two different processes for retreading tires. One is the so-called hot cap process, and the other is the so-called pre-cure process. In the pre-cure process, a strip of rubber having a tread formed therein is wrapped about the outer periphery of the tire casing after the old tread has been removed, the casing sprayed with cement, and a layer of uncured rubber interposed between the outer periphery of the casing and the inner periphery of the tread strip. The thus formed assembly is thereafter subjected to heat and pressure to vulcanize the tread onto the casing.

In the course of vulcanizing a pre-cured tread onto a casing, the casing is mounted on a split rim assembly which engages the bead of the tire to support its inner periphery. An inner tube is placed in the casing and inflated to support the casing against the pressure applied. Before mounting the tire and tube on the rim assembly, however, it has been customary to place a flap of rubber between the inner periphery of the tube and the inside of the casing adjacent its bead. The purpose of the rubber flap is to protect the tube from being damaged by the rim.

In each vulcanizing cycle, the support tube is alternately heated and cooled and alternately inflated and deflated. During the heating phase of the cycle, temperatures in a range of 210° F. to 315° F. are applied to the tube for 90-240 minutes while the tube is maintained inflated at a pressure of about 100 psi. The lower temperatures require longer dwell times than higher temperatures. Thereafter, during the cooling phase the tube is deflated and allowed to cool toward room temperature to permit dismounting of the tire casing and remounting of another on the split rim.

While the use of a protective rubber flap between the tube and the rim extends the life of the inner tube somewhat, it has certain limitations. For instance, a substantial amount of labor is required to position the reinforcing layer properly between the tube, the tire casing and the rim if the desired degree of protection is to be achieved. However, even when protective flaps are used in combination with conventional highway-type tubes, the tubes last for only about five to ten cure cycles. When heat resistant-type tubes are used, the tube can last for approximately sixty to seventy cure cycles before failure. Regardless of which type tube is used, approximately 90% of the tube failures occur in the zone where the protective flap is placed.

OBJECTS OF THE INVENTION

With the foregoing in mind, a primary object of the present invention is to provide a novel tube assembly which is capable of being used repeatedly without failure in a tire retreading process.

Another object of the present invention is to provide an improved tube assembly for use in a process of vulcanizing pre-cured treads onto tire casings in a labor-saving manner.

A further object of the present invention is to provide a rugged tube assembly which enables manufacturing economies to be realized in vulcanizing pre-cured treads onto tire casings.

SUMMARY OF THE INVENTION

More specifically, the present invention provides a tube assembly for use in a process of vulcanizing a pre-cured tread onto a tire casing in an efficient manner. The tube assembly comprises a tubular toroidal wall of elastomeric material having an inner periphery with an inflation stem. A non-woven protective fabric layer is bonded to a major portion of the inner periphery of the tubular wall and has a pair of longitudinal edges each of which is covered by an elastomeric strip. The non-woven protective fabric layer includes a plurality of polyester cords extending in coplanar parallel relation in a single ply in an elastomeric matrix. The cords are disposed at an acute angle with respect to the circumferential median of the tubular wall. Preferably, one or more swatches of reinforcing material are bonded onto the protective fabric layer in the zone of the inflation stem. The thus described tube assembly is highly durable having been found capable of sustaining in excess of 200 vulcanization cycles without failure.

BRIEF DESCRIPTION OF THE DRAWINGS

The foregoing and other objects, features, and advantages of the present invention should become apparent from the following description when taken in conjunction with the accompanying drawings, in which.

DESCRIPTION OF THE PRIOR ART

Figure 1:
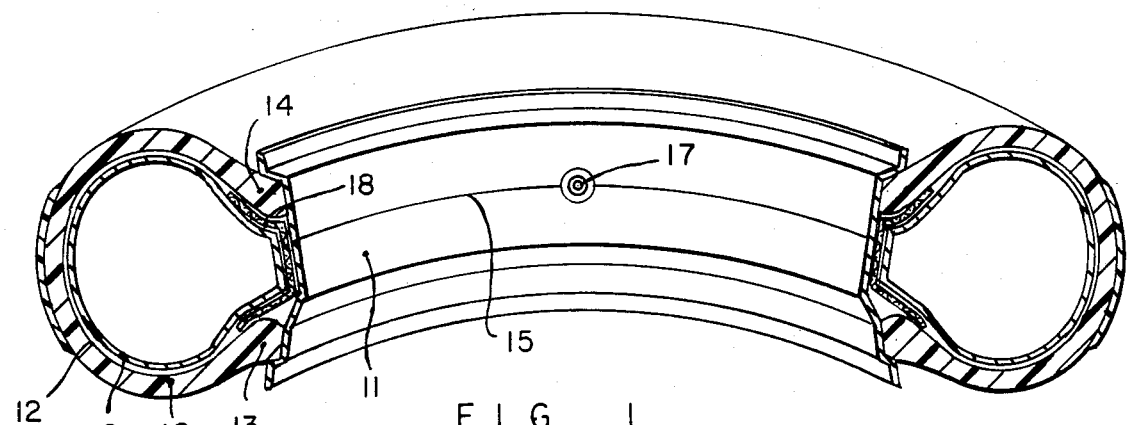
FIG. 1 is a fragmentary perspective view illustrating the arrangement of a tube and protective flap inside a tire casing mounted on a split rim assembly in the conventional labor-intensive manner of vulcanizing treads onto tire casings.

Referring now to the drawings, FIG. 1 illustrates a tire casing 10 mounted on a rim assembly 11 of the type used to support the tire casing 10 in the course of vulcanizing a pre-cured tread 12 onto the outer periphery of the tire casing 10. The tire casing 10 has beads 13 and 14 engaging suitably shaped flanges on the rim assembly 11 which is split along a central plane 15 to facilitate mounting and dismounting of the tire casing 13. A tube 16 having an inflation stem 17 passing through an aperture in the split rim assembly 11 is mounted inside the casing 10 for the purpose of supporting the same in its expanded shape during vulcanization of the tread 12 thereto. Prior to insertion of the tube 16 in the tire casing 10, however, a protective rubber flap 18 is placed between the tube 16 and the inside of the tire casing 10 in the zone of the beads 13 and 14 and between the inner periphery of the tube 16 and the split rim assembly 11. The thus assembled components are enclosed in an envelope and placed in either an autoclave or a steam, electric module, where vulcanization takes place in accordance with conventional practice.

As noted heretofore, the above referenced prior art procedure has certain disadvantages. A major disadvantage resides in the amount of labor required to install and remove the rubber flap 18 from between the inner tube 16 and the tire casing 10 and split rim assembly 11. Care must be taken to install the flap 18 properly in order to minimize damage to the tube 16. In actual practice, however, it is difficult to install the flap 18 quickly and properly.

DESCRIPTION OF THE PREFERRED EMBODIMENT

The present invention overcomes the aforementioned disadvantages of the prior art by providing a novel tube assembly which can be readily installed in and removed from a tire casing and which is resistant to premature failure. To this end, a tube assembly 20 (FIG. 2) is provided. The tube assembly 20 comprises a toroidal tubular wall 21 having an inner peripheral portion 21a with a valve stem 22 extending radially inward therefrom. The tubular wall 21 is preferably extruded of heat resistant halogenated elastomeric material, such as chlorobutyl or bromobutyl rubber, in the customary manner. Obviously, the dimensions of the tubular wall 21 vary, depending upon the size of the tire casing with which the tube is to be used as well known to those skilled in the art.

Figure 3:
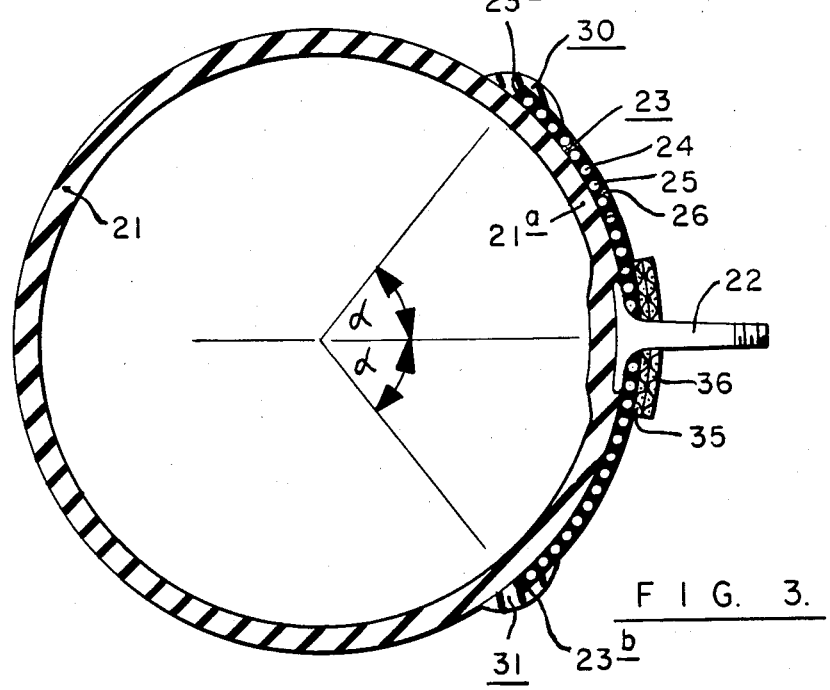
FIG. 3 is an enlarged sectional view taken on line 3—3 of FIG. 2.

For the purpose of protecting the inner periphery of the tubular wall 21 while allowing the same to expand properly inside the casing 10, a non-woven protective fabric layer 23 is provided on the inner periphery 21a of the tubular wall 21. As best seen in FIG. 3, the protective fabric layer 23 covers a major portion of the inner periphery 21a of the tube wall 21 extending through an arc subtended by the included angles alpha having their apexes at the center of the tubular wall 21 when inflated. Each angle alpha is measured with respect to a plane perpendicular to the central axis of the toroidal wall 21 and passing through the center of the inflated tubular wall 21. Preferably, each angle alpha has a minimum value of 55 degrees and a maximum value of 65 degrees. More preferably, the angle alpha is about 60 degrees, so that the combined arcuate extent of the layer 23 corresponds to an included angle of about 120 degrees. This included angle is important because, on the one hand, if the arcuate extent is less than about 110 degrees, an inadequate amount of the inner periphery of the tubular wall 21 is covered. On the other hand, if the arcuate extent is greater than about 130 degrees, there is a tendency for the protective layer to impair expansion of the tubular wall 21 in the course of inflation.

Figure 2:
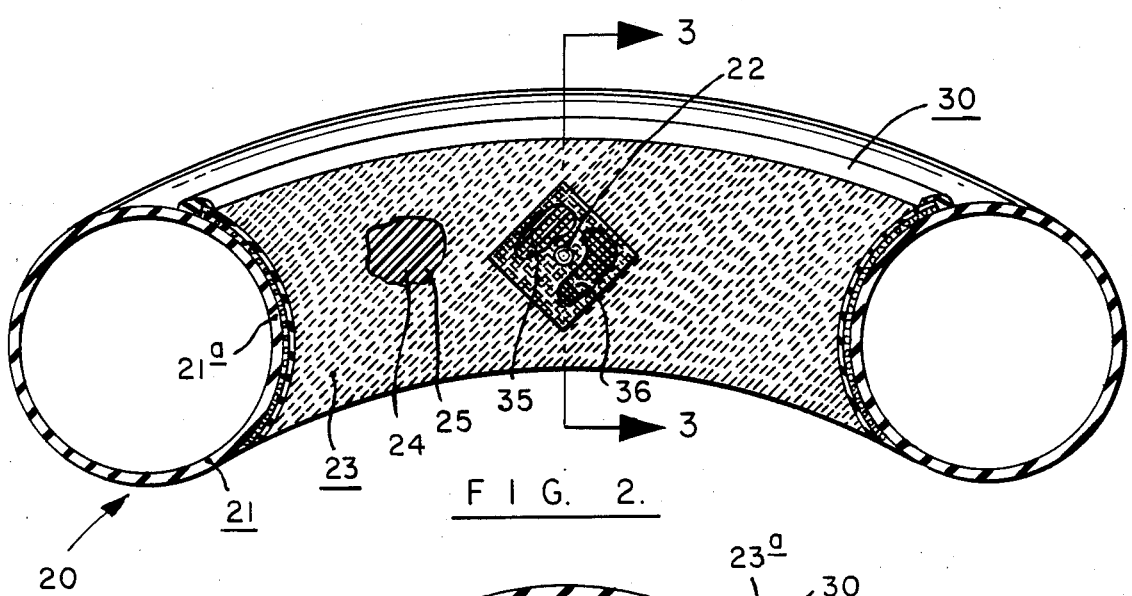
FIG. 2 is a fragmentary perspective view of a tube assembly embodying the present invention.

The non-woven protective fabric layer 23 comprises a plurality of cords 24, 25 extending in parallel coplanar relation and bonded together by an elastomeric matrix 26 of a composition compatible with the composition of the elastomer of the tube wall. As best seen in FIG. 2, the cords 24, 25 are disposed at an angle with respect to the aforedescribed plane passing through the center of the inflated wall 21. The cords 24, 25 must be disposed at an angle in a range of about 40 to 50 degrees, and preferably about 45 degrees. The cords are preferably fabricated of tire grade 24N polyester fibers arranged in coplanar relation in a single ply as illustrated with at least 18 cord ends per inch of cross-section and preferably 24 cord ends per inch. The elastomeric matrix 26 is preferably provided by a layer of halogenated rubber of a thickness sufficient to coat, cover and bond the cords 24, 25 together lengthwise and to provide an overall thickness of 50 gauge.

The protective fabric layer 23 is bonded to the inner periphery 21a of the tubular wall 21. Preferably the layer 23 is vulcanized to the tubular wall after the wall has been extruded and before being formed into the toroidal shape. Opposite ends of the extruded wall with the protective layer vulcanized thereto are joined together in accordance with conventional practice.

In order to enhance the resistance of the protective layer 23 to separation from the tubular wall 21, strips of elastomeric material are provided along both longitudinal edges 23a and 23b (FIG. 3) of the protective fabric layer 23. As illustrated in FIG. 3, a strip of elastomeric material 30 bridges across the upper edge 23a of the protective layer 23 and is bonded to the outside edge margin thereof and to the inner periphery 21a of the tubular wall 21. A strip of elastomeric material 31 is similarly secured across the lower edge 23b of the protective layer 23. Preferably, the strips 30 and 31 are of a rubber composition compatible with the rubber composition of the tube wall and reinforcing layer matrix, such as the described halogenated rubbers. Also, the strips 30 and 31 preferably have a substantially convex or tapered cross-sectional shape such as illustrated in FIG. 3. Preferably the strips 30 and 31 are vulcanized simultaneously with the vulcanization of the protective layer 23 to the tubular wall 21.

The tubular wall 21 is reinforced in the zone of the valve stem 22. To this end, the valve stem 22 has a base which is sandwiched between the outer periphery of the tubular wall 21 and the protective fabric layer 23. The area around the valve stem 22 is reinforced by at least one, and preferably two swatches or layers 35 and 36 of reinforcing material. Each layer of reinforcing material, such as the layer 35, is like in construction to the construction of the protective fabric layer 23 and it includes a series of parallel polyester cords bonded together in coplanar relation in a single ply in an elastomeric matrix. The reinforcing layer 35 is arranged with its cords running parallel with the cords 24 and 25 of the protective fabric 23. The layer 36, on the other hand, is arranged with its cords running perpendicular to the cords 24 and 25, as illustrated in FIG. 2. Preferably, the cords of the fabric swatches 35 and 36 are separated by an awl before the swatches 35 and 36 are slid down the valve stem 22 and placed in the positions illustrated in FIGS. 2 and 3. By separating the cords rather than cutting them, the full strength of the cords is available to reinforce the tube assembly in the zone of the valve stem 22.

The tube assembly 20 of the present invention is used in the tread vulcanization process in essentially the same manner as the tube 16 in the prior art process except for the need to install the requisite protective flaps. Thus, by virtue of the construction of the tube assembly 20 of the present invention, a considerable amount of labor is saved over that required in the prior art process. Furthermore, the tube assembly 20 is more durable, thereby enabling it to be used in a greater number of vulcanizing cycles before failure.

The tube assembly of the present invention is repeatedly subjected to heating and cooling in the aforedescribed vulcanization process. During the heating portion of the cycle, the tube assembly can be subjected to temperatures in excess of 210° F. for up to four hours or for shorter times at temperatures up to about 315° F.

Thereafter, the tube assembly is allowed to cool to room temperature before again being assembled in a tire casing and again subjected to the heating portion of the cycle. As noted heretofore, the tube assembly of the present invention is highly durable in that it is capable of being repeatedly subjected to heating and cooling and inflating and deflating for a significant number of cycles.

To provide the required durability, it is critical in the present invention for the reinforcing layer 23 to be a non-woven fabric of parallel polyester cords disposed at the aforementioned angle of about 45 degrees. Such a construction has been found to provide a tube assembly which is capable of sustaining in excess of 200 cure cycles without failure when subjected to temperatures above 210° F. for up to four hours while being inflated at a pressure of 100 psi. In contrast, a tube assembly of the same construction, but wherein the reinforcing layer 23 comprises nylon cord fibers disposed at a 20 degree angle as disclosed in the referenced parent application, is capable of sustaining only about 40 cure cycles before failure under the same conditions. While 40 cure cycles represents an improvement, the surprising durability provided by the construction of the present invention represents a significant advance in the art.

Both the angle of disposition of the fabric cords in the reinforcing layer 23 and their fiber composition are critical in the present invention. This is because it has been determined from actual tests that repeated inflation and deflation and heating and cooling causes the ends of the nylon cords in the reinforcing layer 23 to separate from the longitudinal strips 30 and 31, thereby limiting the useful life of the tube assembly to about 40 vulcanization cycles. The required 45°±5° angular disposition of the protective layer cords provides the desired degree of tube expansion and contraction while minimizing the aforementioned proclivity for the cords to separate from the strips 30 and 31. Thus, the critical combination of the cord angle and the polyester cord fibers provides the surprising durability discussed heretofore.

While a preferred embodiment of the present invention has been described in detail, various modifications, alterations and changes may be made without departing from the spirit and scope of the present invention as defined in the appended claims.

I claim:

1. For use in a process of vulcanizing a pre-cured tread onto a tire casing mounted on a rim and supported internally by an inflated tube assembly, the improvement wherein said tube assembly comprises:

a tubular wall of halogenated rubber adapted to be installed in said tire casing and inflated to form a toroidal chamber having a central axis, said tubular wall having an inner periphery adapted to be disposed adjacent said rim when mounted in said casing, a valve stem in the inner periphery of said tubular wall for inflating said chamber to support said tire casing during vulcanization and for deflating said chamber to afford removal of said tube assembly from said tire casing after said tread is vulcanized thereto, a protective non-woven fabric layer overlying a major portion of the inner periphery of said tubular wall and vulcanized thereto, said fabric layer including a plurality of polyester cords extending in coplanar parallel relation in an elastomeric matrix at a spacing of between 18 and 24 cord ends per inch, said protective layer extending through an arcuate extent in a range of about 55 to about 65 degrees with respect to opposite sides of a plane perpendicular to said central axis and having longitudinal edges defining the limits of said arcuate extent, said non-woven protective fabric layer being arranged with said cords disposed at an angle in a range of about 40 degrees to about 50 degrees with respect to said plane, and means including a pair of strips of elastomeric material spanning across said longitudinal edges and permanently bonding said protective fabric layer edgewise to said inner periphery of said tubular wall, whereby the protective fabric layer cooperates with the tubular wall to permit it to expand for supporting the casing while preventing the tubular wall from being damaged by the rim.

2. The tube assembly according to claim 1 wherein said valve means protrudes radially inward from said tubular wall and through said fabric layer, and including at least one layer of reinforcing means bonded to said protective fabric layer around said valve stem.

3. The tube assembly according to claim 2 wherein said layer of reinforcing means includes a swatch of material having cords extending in parallel relation in an elastomeric matrix and overlying said protective fabric layer.

4. The tube assembly according to claim 3 including a pair of said reinforcing layers extending outwardly from said valve means, both layers being of like construction with the cords of one layer extending in the same direction as the cords of said protective fabric layer and the cords of the other layer extending substantially perpendicular thereto.

5. A durable tube assembly for repeated use in a process of vulcanizing a pre-cured tread onto a tire casing mounted on a rim support, comprising:

a toroidal tubular wall of halogenated rubber having an inner periphery with a valve stem and adapted to be installed in the tire casing with the inner periphery of the tubular wall adjacent to the rim support, a protective non-woven fabric layer bonded onto the inner periphery of said tubular wall and covering a major portion thereof, said protective layer including a series of polyester reinforcing cords disposed in coplanar parallel relation in an elastomeric matrix, said protective layer extending through an arcuate extent in a range of about 55 to about 65 degrees with respect to opposite sides of a plane perpendicular to said central axis and having longitudinal edges defining the limits of said arcuate extent, said layers including about 18 to 24 cards per inch, said cords in said protective layer being disposed at an acute angle in a range of about 40 degrees to about 50 degrees with respect to a plane perpendicular to the central axis of the inflated tubular wall, an elastomeric strip permanently bonded both to said tubular wall and said protective layer along each longitudinal edge thereof, and at least one swatch of reinforcing material bonded onto said protective layer around said valve stem, said reinforcing swatch having parallel cords disposed in an elastomeric matrix, said tube assembly being capable of sustaining in excess of 200 tread vulcanization cycles each comprising a heating and cooling and inflation and deflation phase wherein temperatures in excess of 210° F. are applied for up to four hours while the tube assembly is inflated at a pressure in excess of about 100 psi.

6. A tube assembly for use in supporting a tire casing while a pre-cured tread is being vulcanized thereto, said tube assembly comprising:

a toroidal elastomeric tube having an inner periphery with a valve stem permitting inflation and deflation thereof, a protective layer of non-woven material overlying a major portion of the inner periphery of said tube to a predetermined arcuate extent between parallel longitudinal edges thereof, said arcuate extent being subtended by an included angle of at least about 110 degrees but less than about 130 degrees, said protective layer including a series of parallel polyester cords bonded together in coplanar relation by an elastomeric matrix, said cords being arranged in a single ply at a spacing of about 24 cord ends per inch and being disposed at an angle of about 40 degrees with respect to said longitudinal edges, a strip of elastomeric material spanning across each of said edges and permanently bonded both to said layer and to said tube, and a plurality of swatches of reinforcing material like in construction to said protective layer and bonded thereto around said valve stem.

* * * * *